Figure 1:
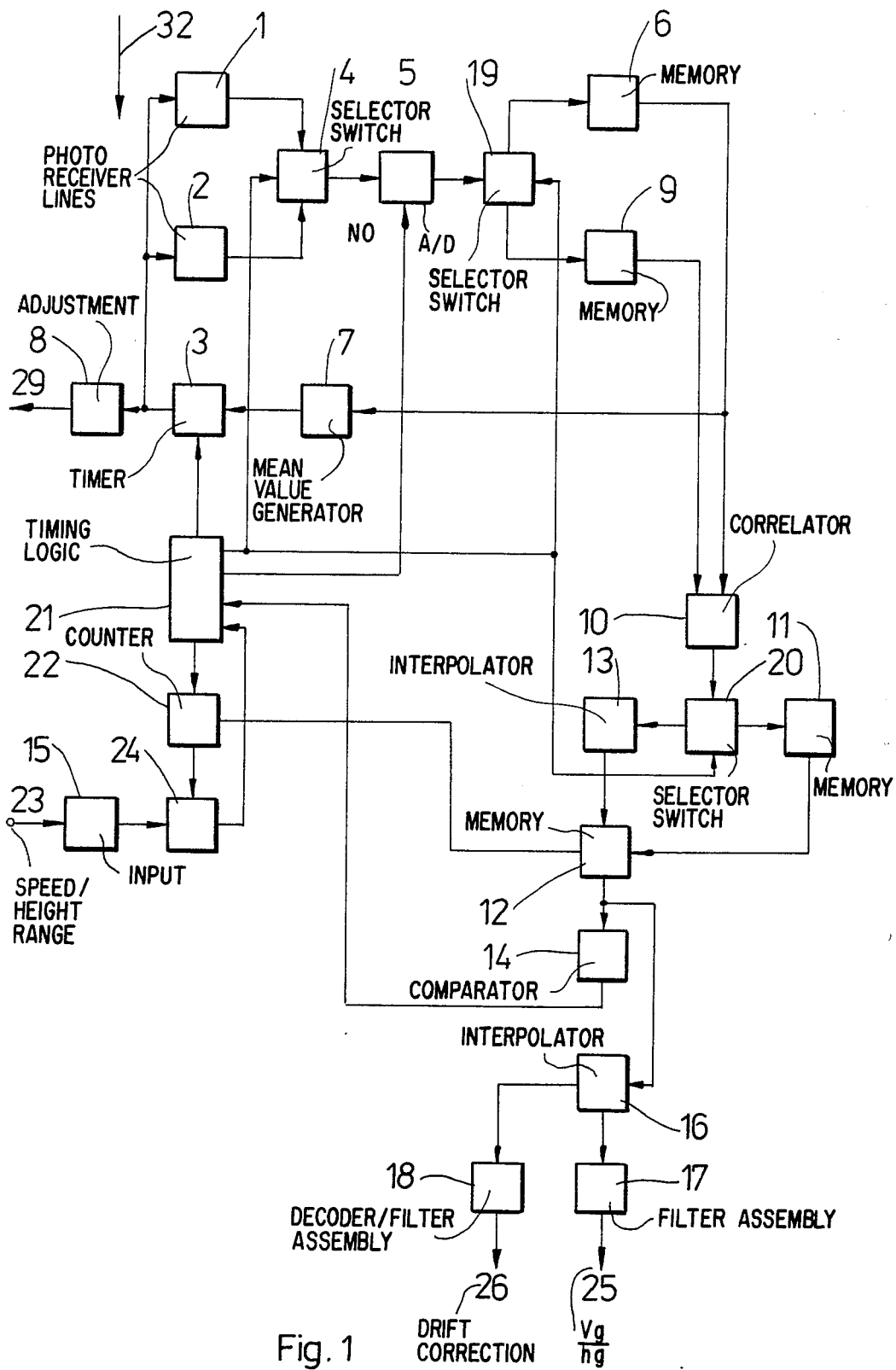

| United States Patent [19]
Görsch et al.

[11] Patent Number: 4,600,283
[45] Date of Patent: Jul. 15, 1986

[54] APPARATUS AND METHOD FOR THE AUTOMATIC CONTROL OF AN AERIAL PHOTOGRAPHIC CAMERA

[75] Inventors: Rainer Görsch; Wolf-Rainer Gräfe, both of Berlin; Hans-Jörg Grundmann, Neustrelitz; Peter Poerschke; Werner Steffen, both of Berlin; Thomas Braunschweig; Rolf-Peter Mark, both of Jena; Bernard Beck, Jena-Lobeda, all of German Democratic Rep.

[73] Assignee: Jenoptik Jena GmbH, Jena, German Democratic Rep.

[21] Appl. No.: 631,280

[22] Filed: Jul. 17, 1984

[30] Foreign Application Priority Data

Aug. 4, 1983 [DD] German Democratic Rep. ... 253719
Dec. 1, 1983 [DD] German Democratic Rep. ... 257348

[51] Int. Cl.$^4$ .......................... G03B 39/00; G01P 3/36
[52] U.S. Cl. ......................................... 354/66; 356/28
[58] Field of Search ...................... 354/65, 66; 356/28

[56] References Cited

U.S. PATENT DOCUMENTS 3,997,795 12/1976 Pohl et al. ..................... 354/66 X Primary Examiner—William B. Perkey
Attorney, Agent, or Firm—Jordan and Hamburg

[57] ABSTRACT

Method and apparatus for automatically controlling aerial photographic cameras. An exact and reliable control device of low electronic and optical cost, which unburdens the operator, is realized by means of two photoreceiver lines positioned parallel to each other and perpendicular to the flight direction. At least the first line is connected to a data memory, which as well as the second line is connected to a correlator. The correlator is connected, via units for calculating the vg/hg ratio and/or the drift, to setting mechanisms of the aerial camera. A third photoreceiver line can also be provided, coupled subsequently to a data memory. The invention is utilizable in photogrammetry.

3 Claims, 5 Drawing Figures

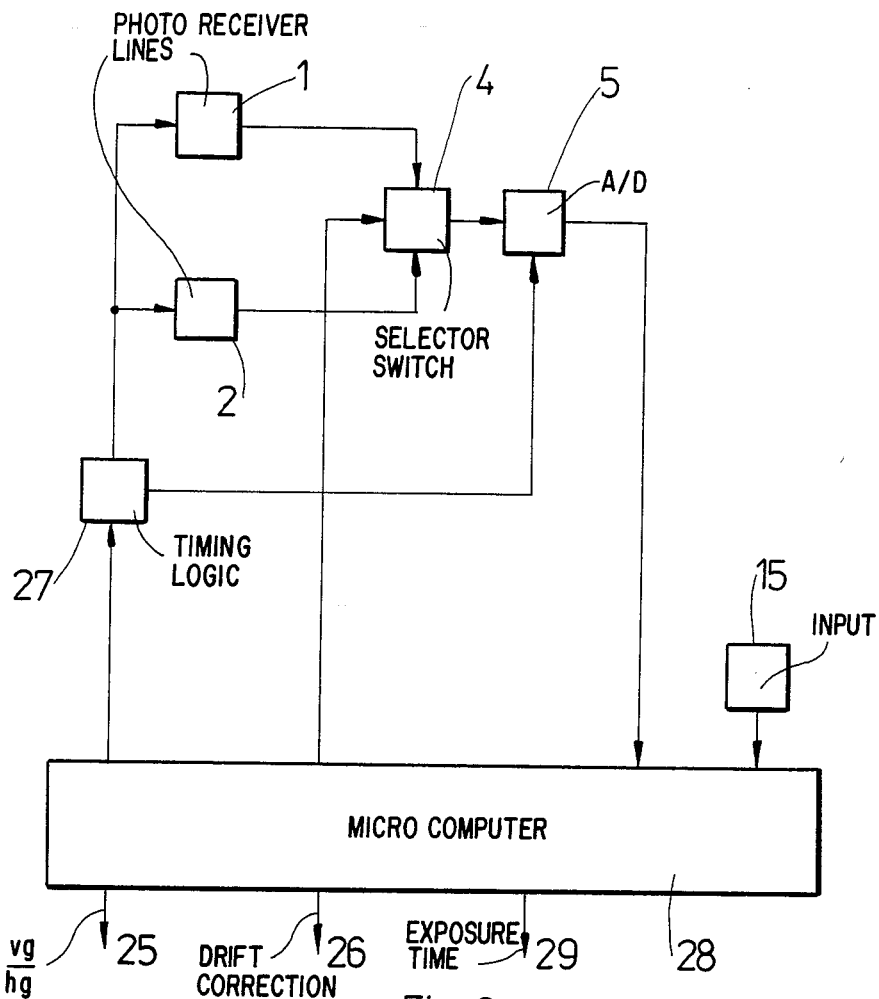
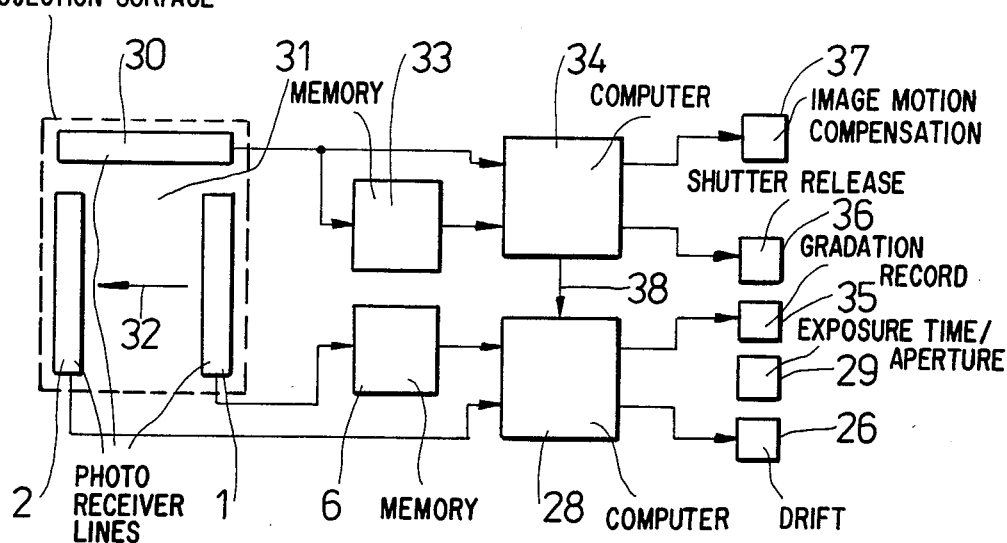

APPARATUS AND METHOD FOR THE AUTOMATIC CONTROL OF AN AERIAL PHOTOGRAPHIC CAMERA

The invention relates to an apparatus and a method for analyzing the ratio between speed and height $h_g/v_g$, drift, as well as light values, the conversion of these values into setting data for exposure intervals, exposure time, aperture and drift compensation and the transfer of the setting data to the corresponding setting devices of the aerial camera.

An automatic control instrument for aerial cameras is already known (DD-WP No. 113,809), which contains in the projection surface of an objective two digital photoreceiver matrixes of 4 lines each separated from each other, to which is subsequently coupled an information processing stage, which calculates the exposure interval, the drift and an optimal exposure time, and which controls the aerial camera with these values. Exposure intervals and drift are thereby derived from the correlation of the scanned values in a line of both photoreceiving matrixes. Therefore the scanning values of a line are temporarily stored and are constantly compared in a correlator with the actual scanning values of the other line. A subsequently coupled analyzer derives the maximum of the correlation factor and its corresponding shift of the frame in the direction of the line (corresponding to drift) and in the direction of flight (corresponding to vg/hg). From the scanning values is furthermore grained information concerning the picture brightness, with the aid of which the preset exposure time is modified.

This configuration has a number of disadvantages. Firstly, mainly due to the high price of photoreceiver matrixes, the costs are very high. Furthermore, the derivation of the vg/hg ratio functions sufficiently exactly only at a very low drift value, because due to the drift of the airplane, the image of the terrain of the second photoreceiver matrix appears twisted with respect to the first matrix, so that the correlation factor is decreased. Because of this, at unfavorable terrian, there no longer results a plottable maximum of the correlation factor, or the position of the correlation maximum is falsified. The way to avoid this is to reduce the distance of the photoreceiver matrixes, however, it is conditional upon an increase of the drift analysis error, because the elements of the matrix have a given magnitude which cannot be disregarded.

There is further known a device for measuring the speed and/or the direction of motion of an image structure (DE-AS No. 26 36 769), wherein a cylindrical lens system and one to three differential diodes are utilized. In this solution, the terrain is scanned along a line lying in the direction of flight, so that if a uniform, elongated section of terrian accidentally coincides with this line, then the vg/hg analysis fails.

The object of the invention is to increase the exactitude and reliability of control instruments for aerial cameras, whereby the required electronic and optical costs are simultaneously reduced, and the operator unburdened.

The object of the invention is to provide an apparatus and a corresponding method for the optimal and automatic control of aerial cameras with respect to the vg/hg ratio, drift, as well as exposure time.

According to the invention, this object is achieved by providing an apparatus for automatically controlling aerial photographic cameras, wherein a first and a second photoreceiver line are disposed on a projection surface essentially parallel to each other and perpendicular to the direction of flight, at least the first line is connected with a data memory and, this data memory as well as the second line are connected to a correlator, which is in turn connected via units for the calculation of the vg/hg ratio an/or drift to the setting mechanisms of the aerial camera. It is preferred in accordance with the invention that:

the output of the first photoreceiver line (1) is connected to the first input of a selector switch (4), the output of the second photoreceiver line (2) is connected to the second input of the selector switch (4);

the first output of a timing logic stage (21) is linked together not only to the control input of the selector switch (4), but also to the control input of a second selector switch (19), as well as to the control input of a third selector switch (20), whereas the second output of the timing logic stage (21) is connected to the control input of an A/D converter (5) and the output thereof is connected to the information input of the second selector switch (19);

the output of the selector switch (4) is connected via the A/D converter (5) to the information input of the second selector switch (19), of which the first output is connected to the input of a first memory (6), its second output to the input of a second memory (9);

the output of the first memory (6) is linked together with the first input, and the output of the second memory (9) to the second input of a correlator (10), whereas the output of the correlator (10) is connected to the information input of a third selector switch (20), the first output of the third selector switch (20) is connected via a reference value memory (11) to an input of a third memory (12), the second output is connected via an interpolator (13) to the second input of the third memory (12);

the third output of the timing logic stage (21) is linked to the input of a counter (22), of which the first output is linked to the third input of the third memory (12), and the output of the third memory (12) is connected not only to the input of a comparator (14), but also to a second interpolator (16), whereas the output of the comparator (14) is connected to the first input of the timing logic stage (21) and respectively one output of the second interpolator (16) is linked together to the subsequently coupled inputs of the decoder/filter assembly (17, 18);

the output of the first memory (6) is connected via a mean value generator (7) to the input of a timer (3), the fourth output of the timing logic stage (21) is connected to the second input of the time (3), and the output of the timer (3) is connected ont only to an adaptor assembly (8), but also to two inputs of the photoreceivers lines (1, 2);

the outut of an input stage (15) is linked together to the input of a second comparator (24), and the second output of the counter (22) with the second input of the second comparator (24) and the output thereof to the second input of the timing logic stage (21);

the control signal $v_g/h_g$ (25) is applied to the output of the decoder/filter assembly group (17), the control signal for the drift (26) is applied to the outut of the decoder/filter assembly (18), and the control signal for the exposure time (29) is applied to the output of the adaptor assembly (8).

It is furthers desirable that:

the output of a photoreceiver line (1) is connected to the first input of a selector switch (4), the output of a second photoreceiver line (2) is connected to the second input of the selector switch (4);

the output of the selector switch (4) is connected to the first input of the A/D converter (5);

the first output of the timing preparation logic (27) is connected to the inputs of the photoreceiver lines (1) and (2), and the second output of the timing preparation logic (27) is connected to the second input of the A/D converter (5);

the first output of a microcomputer (28) is connected to the input of the timing preparation logic (27), the second output to the input of the selector switch (4);

the output of an input stage (15) is connected to the first input of the microcomputer (28) and the output of the A/D converter (5) is connected to the second input of the microcomputer (28);

the control signal $v_g/h_g$ (25) is applied to the third output of the microcomputer (28), the control signal for the drift (26) is applied to the fourth output, and the control signal for the exosure time (29) is applied to the fifth output.

Furthermore, it is advantageous that on the projection surface, essentially parallel to the direction of flight is provided a third photoreceiver line which is subsequently coupled in the data memory, that the two parallel photoreceiver lines are assigned a first, and the third line a second correlator for the analysis of the $v_g/h_g$ ratio, that the two correlators are connected to units for calculating the $v_g/h_g$ ratio and/or drift, and that the units for calculating the $v_g/h_g$ ratio and/or drift access a system assembly, whereby a favorable variation consists therein that the unit for calcualting the drift is connected to a mechanism for drift compensation of the aerial camera, that the unit for calculating the $v_g/h_g$ ratio is connected to the shutter release of the aerial camera, that the data memory is connected to a unit for calculating and setting the optimal film gradation, and that the data memory is connected to a unit for calculating and setting the exposure time. The method of the invention consists in interrogating the contents of the second photoreceiver line in a fixed timing raster, in accordance with the terrain which is being flown over. After each inquiry the result is compared and correlated with the content of the first interrogated first photoreceiver line in memory. By determining the timing during which a maximal correlation between the contents of the first interrogated first photoreceiver line and the chronologically subsequently interrogated second photoreceiver line has been acheived, measure is given for $v_g/h_g$ ratio and the line shift for the corresponding maximal correlation gives the drift. Furthermore the mean value of the line content of the first photoreceiver line is derived as the control magnitude, respectively in a configuration of three photoreceiver lines. In a first cycle, the date (measuring values) of the third photoreceiver line lying parallel to the flight direction are stored, and the data of that particular one of the two photoreceiver lines which lies in front in the movement direction of the terrain image are stored.

In a second cycle, from the data of the third photoreceiver line, by correlation, the shift of the image in flight direction is determined, the $v_g/h_g$ ratio is calculated from the shift, and transmitted to the mechanism for controlling the overlap, the image shift is compared with the distance of both photoreceiver lines, and when the distance is attained, a signal is given to the first correlator. The first correlator, upon receiving the signal, compares the stored data of the first photoreceiver line with the actual data of the second line, derives the drift from the deviation, and transmits the results to the mechanism for drift compensation.

A variation of this method consists in adding the various shift values to each other, after each line cycle superceding the stored data of the photoreceiver line by the actual data, and driving the $v_g/h_g$ ratio from the thereby derived differential shift and sending it to the mechanism controlling the overlap, and intermittenlly transposing the data of the photoreceiver line lying parallel to the flight direction by the distance of the two parallel photoreceiver lines and storing them, and realizing the comparison of the image shift and the distance of the two parallel photoreceiver lines by correlating the actual data of the third line with the data stored in this way.

EXEMPLIFIED EMBODIMENT

Figure 4:
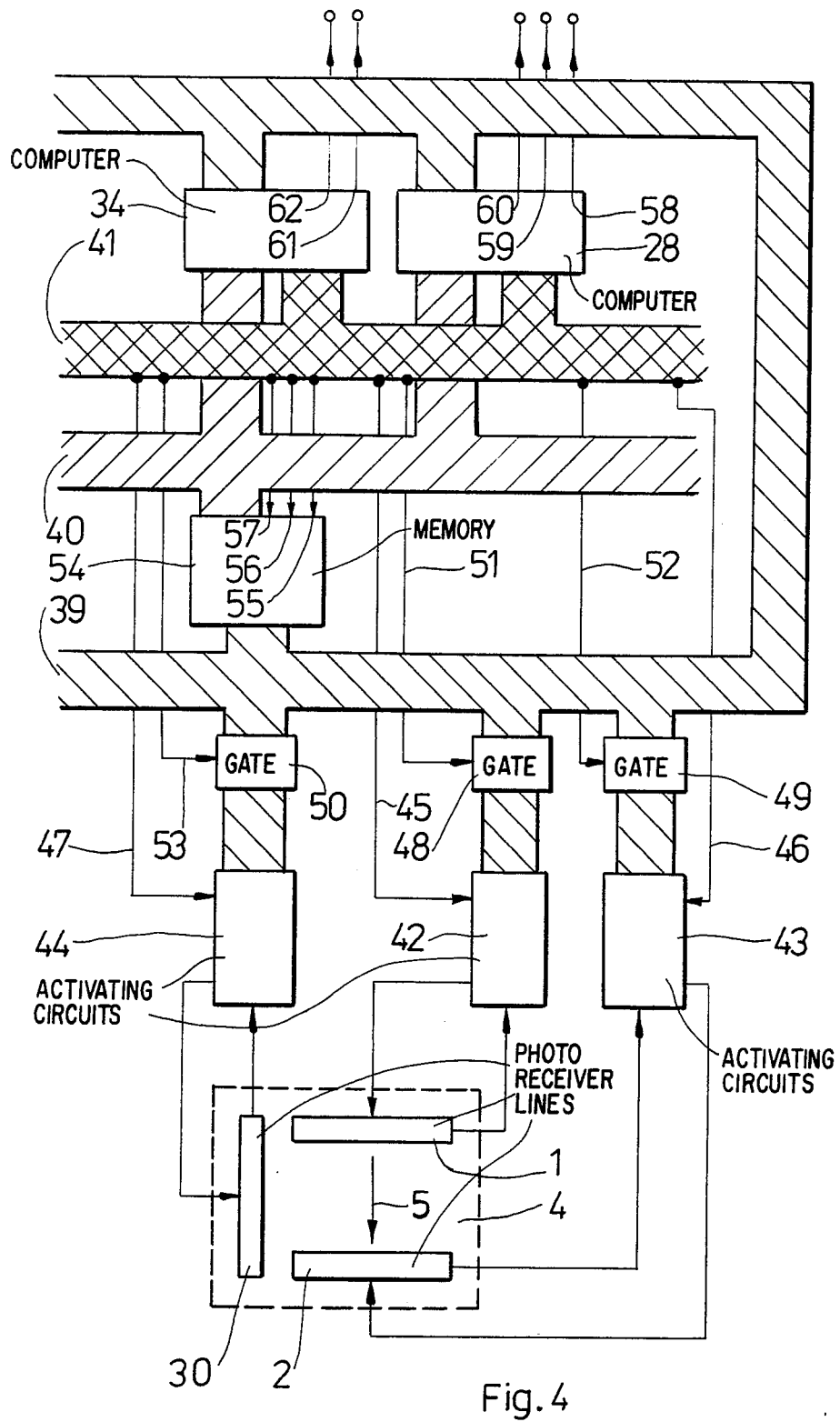
Figure 5:
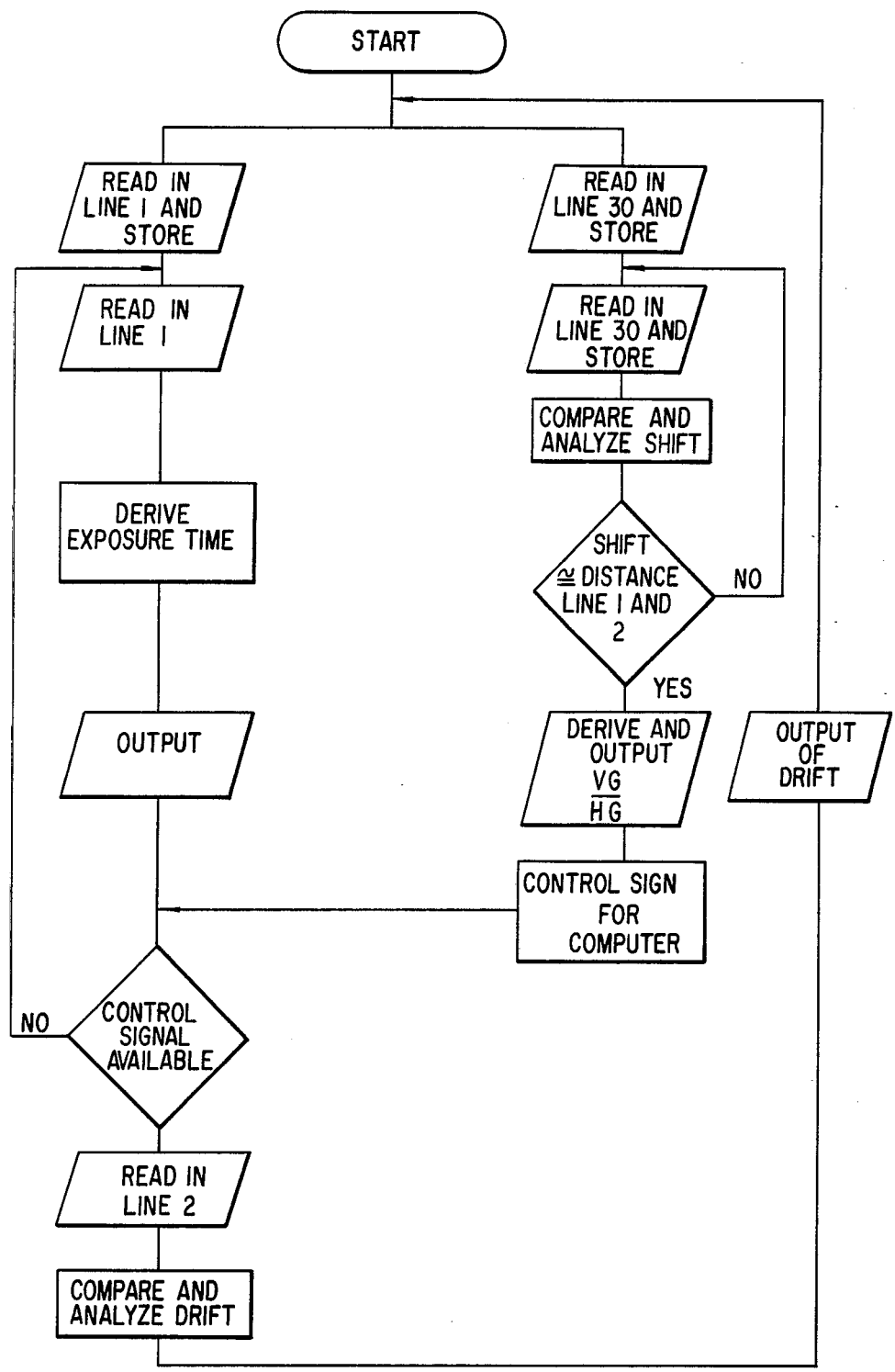

The invention is further explained by means of the following examples. They show:

FIG. 1: Block diagram for controlling an aerial camera by utilizing two to each other parallel positioned photoreceiver lines;

FIG. 2: Control according to FIG. 1 utilizing a microcomputer;

FIG. 3: Block diagram (greatly simplified) utilizing a third photoreceiver line;

FIG. 4: Schematic representation of the linking of the photoreceiver lines with the computer;

FIG. 5: Flowchart of the camera control utilizing a configuration according to FIGS. 3 and 4.

In FIG. 1, an objective reproduces the terrain located perpendicularly under the airplane on a projection surface, wherein are positioned at a small optical distance two parallel photoreceiver lines positioned such that the direction of flight is perpendicular to them. From the time difference during which identical image structures travel from the first photoreceiver line 1 to the second photoreceiver line 2, with the help of electronic analysis the control magnitude $v_g/h_g$ is derived, which regulates the image motion compensation and the longitudinal overlap of the aerial camera. Furthermore, an evental shift of image structure in the line direction is utilized, in order to perform with the help of a servomotor the readjustment of the aerial camera and of the control mechanism of the two photoreceiver lines into exact flight direction, so that thereby the drift and other movements of the airplane can be compensated, which cannot be influenced. Thereby results the effective possibility of producing aerial pictures having correctly adhered to to percentage longitudinal overlap and alignment, without thereby needing to have an operator perform the demanding procedure of readjusting the control device by hand. Furthermore, the electronic analysis takes care if the airplane makes a turn, that the effective approximated values for the return flight are dervied from the last processed information for the alignment of the control mechanism and of the aerial camera, and that the control magnitude is emitted.

For providing a small optical distance between the two photoreceiver lines, a 90° corner reflector is brought into the beam path of the objective, the corner reflector separates the light beams and directs them into two opposite directions. Thereby two projection planes result, in each of which there is positioned a photoreceiver line. Both photoreceiver lines are mounted in such that they are shifted by a small amount to the bottom in respect to the main beam. If the optical system moves now, a point of view on the first projection plane travels from bottom to top, and on the second projection plane from top to bottom. Thereby it is established that the first photoreceiver line 1 is located before the corner reflector, and the second photoreceiver line 2 behind the corner reflector.

For ensuring the correlation calculations, the optical system provides for an intended elliptical defocusing, which guarantees that the scanning zones of the photoreceiver lines overlap in each renewed inquiry.

The two photoreceiver lines 1 and 2 are activated by the timer 3. While the content of the photoreceiver line 1 is stored via the selector switch 4, the analog/digital converter 5 and the selector switch 19 in the memory 6, then the linear means value is derived in the mean value generator 7, which can serve for controlling the exposure time of the photoreceiver lines 1, 2 and via the adjustment 8 also for controlling the exposure time of the aerial camera, after the shortest possible time the selector switch 4, 19 is activated and the content of the photoreceiver line 2 is also stored via the analog/digital converter 5, however, in memory 9. With the two memory values first the correlation value at a shift=O is calculatd in the correlator 10, and is then stored via the selector switch 20 in memory 11 as a comparison value for later correlation calculations.

With the help of the timing logic 21, a timing raster is produced which repeatedly reads out the content of the photoreceiver line 2, stores it in memory 9, also counts the number of inquiries of line 2 in the counter 22, and correlates in the correlator 10 the content which each time is stored in memory 9 with the content contained in memory 6. The maximal value of the correlation result, which is compared in memory 11, as well as the respective shift parameter are stored in memory 12 after interpolation via the correlation values by the individual shifting parameters in the interpolator 13. The maximal value is then compared with the previously derived individual correlation maxima corresponding to the one in counter 22 and the respective shift parameters in the comparator 14, until a maximal correlation between the photoreceiver line 1 and the photoreceiver line 2 is achieved. After the interpolation 16 of the individual correlation maxima stored in 12 with the respective shift parameters, in the time raster given by the timing logic 21 and the corresponding counter position, via a decoder and filter assembly group 17, the counter position of the interpolated correlation extreme interpolated in the interpolator 16 is emitted, as a measure of the speed to the height ratio.

Furthermore, via the decoder/filter assembly group 18 the corresponding shift parameter is emitted to the aerial camera as a measure of the drift correction 26 of the airplane. Subsequently the switch over of the switches 4, take place and the new start with the inquiry of the photoreceiver line 1. This switch over with a new start also takes place when a speed/height range 23 preset by the input device 15 is exceeded, i.e. when all electronic correlation attempts fail in a provided range.

FIG. 2 shows a configuration of microelectronic printed circuits. A microcomputer, such as for instance a Z8, manufactured by the Zilog Company, inclusive with its software, takes over the previously mentioned taks, respectively the sequence control and the preparation of the controlling values. The two photoreceiver lines 1 and 2 respectively are connected each to one input of the switch 4. The output of the switch 4 is connected to the data input of the A/D converter 5. The microcomputer 28, via two control lines, controls the switch 4 and the timing preparation logic 27, which prepares the timing for the photoreceiver lines 1 and 2, as well as for the A/D converter 5. The microcomputer is furthermore connected to an input unit 15 for operating the control mechanism, and is provided with outputs 25 for the vg/hg ratio, 26 for the drift, and 29 for the exposure time.

In FIG. 3 are illustrated three photoreceiver lines, 1, 2 and 30 the projection surface 31 of an objective, which is not represented here. The arrow 32 points in the direction of the image movement of the terrain which is projected by the objective on the projection surface 31. After the lines 1 and 30 are coupled respectively a data memory 6, 33 and a computer 28, 34; the lines 2, respectively 30, are also directly linked with the computer 28, respectively 34. The computer 28 is provided with outputs for drift compensation 26, for exposure time/aperture control 29, and for gradation record 35, the computer 34 for shutter release 36 and for the image motion compensations 37. Furthermore, two computers are connected via a control line 38. After turning on the control mechanism, the data of the photoreceiver line 1 and 30 are read into the memory 6, respectively 33. In the computer 28, the data entering from line 2 constantly being analyzed in respect to image brightness; the maximal and minimal terrain brightnesses are determined and from these values are calculated not only an optimal exposure time/aperture combination, corresponding control impulses formed and emitted to the exposure time/aperture control 29, but also the optimal film gradation is calculated and emitted to the gradation record 35. In the computer 34 the stored image data of memory 33 are constantly correlated with new incoming image data from the line 30, and the corresponding shift is determined. From this the vg/hg ratio is calculated, then serves for controlling the shutter release 36 and the image motion compensation 37. As soon as the derived shift reaches the value which corresponds to the distance of the two lines 1, 2, the order is given to the computer 28 via the control line 38, to compare at that point the stored values of line 1 with he incoming values of line 2, and to determine from the derived shift the value of the drift, and to emit it to the drift compensation 26. Now the process begins again with storing of data from line 1 and 30 in the memory 6, respectively 33.

A considerably increase in exactitude of the vg/hg analysis can be achieved, when the data of the third photoreceiver line 30 in memory is superseded after each inquiry into the shift by the actual values, and the value of the shift has achieved the value of the distance between the lines 1, 2, and the order is given to the computer 28 to determine the drift, when simultaneously with the storing of the value of line 1 in memory 6, the intermediary memory is reset to zero. Thereby is realized a differential analysis of the shift, whereby the influence of the drift upon the magnitude of the maximum of the correlation factor is greatly reduced. The input of the setting values, such as film sensitivity, degree of overlap, etc., which are required for the formation of the control signals in the computer 28 and 34, is performed be conventional means, such as switches and keyboards which are not shown here. The diagram of FIG. 4 shows the realization of the linking of the photoreceiver lines 1, 3, 30 with the computer 28, 34. The computers 28, 34, which preferably are configured as single-chip microcomputers, utilize a joint system bus, consisting of a data bus 34, address bus 40, and control bus 41. The photoreceiver lines 1, 2, 30 can, for instance, be CCD-lines of 256 elements each. They are controlled by conventional activator circuits 42, 43, 44. These contain the actual activator component, which realizes the read out of the data from the CCD-line, sample & hold amplifier and A/D converter for converting the analog values into digital data values. The activating circuits 42, 43, 44 are addressed by the control bus 41 via the control lines 45, 46, 47. The acceptance of the data on the data bus 34 is controlled by the gate circuits 48, 49, 50, which receive the respective commands from the control bus 41 via the control lines 51, 52, 53. The memory component 54, which can be, for instance, a 1K×8-RAM, serves for the intermediary data storage. The work of the memory component 54 is controlled by the control bus 41 via the inputs 55 (chip-select), 56 (data out) and 57 (data in). The connection of the computers 28 and 34 to the aerial camera is provided via the outputs 58 for drift compensation, 59 for exosure time/aperture control, 60 for gradation recording, 61 for shutter release and 62 for image motion compensation.

The function of the control mechanism according to the invention is further explained by means of the approximate operating sequence plan of FIG. 5. The left string thereby describes the tasks of the computer 28, and the right string those of the computer 34. After turning on the control, data of line 1 is read in and stored in a memory range of the memory component 54. Subsequently, the data of line 1 are read in again and a routine for determining the exposure values begins. The particularities of this routine are not the object of the present invention; it is, however, necessary to determine out of a series of data of line 1 the minimal and maximal brightness, to calculate from these values, and in a given case, after further intermediary values, an optimal exposure, and under consideration of an optimal aperture setting, to derive the exposure time, to produce corresponding control impulses, and to emit them to the chamber. Furthermore, for the maximal utilization of the content of the information of the film, it is suitable to calculate from the minima and maxima of the brightness the optimal film gradation, as has already been proposed in patent No. DD-156299. Because the exosure time is determined by the same computer, in influence of the gradation on the effective film sensitivity can be realized in a simple way by the selection of the exposure time. This routine can be repeated until the computer 34 gives a control signal for processing the following task. During the processing of this routine, the computer 34 determines the vg/hg ratio. Therefore, the data of line 30 are read in and are stored. The computer 34 compares the two data series with each other and derives the shift of the image of the terrian on the projection surface. The value of the shift is compared with he distance of the lines 1 and 2. If this distance is not yet attained within a certain tolerance range, then a new line 30 is read out and the data are stored. It is most advantageous to exceed the first entered value of the memory during storing, and to proceed during comparing from the last and penultimate data series of the line 30, because during this time, the drift induced changes in the image data are small, and therefore result in a sharp extreme of the correlation factor during the comparison. The determined shift values are added to each other and are individually compared with the distance of the lines 1 and 2. If the shift lies within the tolerance range of the distance, then the vg/hg ratio is calculated and emitted to the aerial camera, as well as control signals are produced for the computer 28. Thereupon the line 2 is read in and is compared with the stored values of line 1. From this comparison, the drift is determined and emitted to the drift compensation of the aerial camera. As long as the control is switched on, the entire cycle starts again. The realization of the invention is not limited to the represented exemplified embodiment, it is possible, for instance, that more than the shown 3 photoreceiver lines are provided, so long as only one of the represented solution arrangements and processing of the image data takes place. Furthermore, it makes no difference whether the computer 28 and 34 are used only for determining the numerical values for the vg/hg ratio, drift, brightness, aperture, exposure time, or whether the required control inpulses are immediately formed for the aerial camera.

A special advantage of the solution according to the invention lies in that sudden tilting of the airplane along its longitudinal or transversal axis induced shifts of the reproduction of the terrain on the projection surface 31 can be recognized, and thereby an error in the results can be avoided. Tilting along the longitudinal axis is indicated in a sudden decrease of the correlation data of the line 30 which lies in the direction of flight, whereas tilting along the transverse axis causes sudden changes of the vg/hg ratio, which can even turn negative at this point. Due to the "differential" derivation of the vg/hg ratio, changes of this kind are recognized and are taken into consideration in the control of the aerial camera.

What is claimed is:

1. Method for controlling an aerial camera wherein first and second photoreceiver lines are disposed parallel to one another and perpendicular to the flight direction of the camera, and a third photoreceiver line is disposed parallel to said flight direction, comprising, in a first cycle, storing the data (measurement values) of the third photoreceiver line lying parallel to the flight direction and storing the data (measurement values) of the first photoreceiver line, which lies in front of the second receiver line in the flight direction; in a second cycle calculating from the data of the third photoreceiver line the shift of the image in the flight direction by correlation; calculating the vg/hg ratio from the shift and sending it to a mechanism for controlling the overlap; comparing the image shift with the distance of the two photoreceiver lines, and when the distance is attained, sending a signal to a first correlator; then, upon receipt of said signal, comparing the stored data of the first photoreceiver line with the actual data of the second line in said first correlator, determining the drift from the shift, and applying it to a mechanism for drift compensation.

2. Method for controlling an aerial camera according to claim 1, comprising adding the determined shift values, after each second cycle superceding the stored data of the third photoreceiver line by the actual data, and calculating the vg/hg ratio from the differential shift derived in this manner, and applying it to a mechanism for controlling the overlap.

3. Method for controlling an aerial camera according to claim 1, comprising mathematically transposing the data of the photoreceiver line lying parallel to the direction of flight by the distance of the two parallel photoreceiver lines and, storing the transposed data, and realizing the comparison of the image shift with the distance of the two parallel photoreceiver lines by correlating the actual data of the third line with the data stored in this manner.

* * * * *